United States Patent
Kurtz et al.

(10) Patent No.: US 10,929,581 B2
(45) Date of Patent: Feb. 23, 2021

(54) SELECTIVELY GROUNDING FILL WIRES

(71) Applicant: International Business Machines Corporation, Armonk, NY (US)

(72) Inventors: Steven Joseph Kurtz, Austin, TX (US); Ronald D. Rose, Essex Junction, VT (US); David J. Widiger, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/432,805

(22) Filed: Jun. 5, 2019

(65) Prior Publication Data
US 2020/0387580 A1    Dec. 10, 2020

(51) Int. Cl.
*G06F 30/30* (2020.01)
*G06F 119/12* (2020.01)
*G06F 119/10* (2020.01)

(52) U.S. Cl.
CPC .......... *G06F 30/30* (2020.01); *G06F 2119/10* (2020.01); *G06F 2119/12* (2020.01)

(58) Field of Classification Search
CPC ... G06F 30/30; G06F 2119/12; G06F 2119/10
See application file for complete search history.

(56) References Cited

U.S. PATENT DOCUMENTS

| | | | |
|---|---|---|---|
| 7,231,624 B2 | 6/2007 | Vuong et al. | |
| 7,676,772 B1 | 3/2010 | Nakagawa et al. | |
| 7,865,858 B2 | 1/2011 | Vuong et al. | |
| 8,001,516 B2 | 8/2011 | Smith et al. | |
| 8,327,300 B2 | 12/2012 | Vuong et al. | |
| 8,356,265 B2 | 1/2013 | Fouad et al. | |
| 8,643,184 B1* | 2/2014 | Zhang | H01P 3/081 257/758 |
| 8,769,464 B2 | 7/2014 | Koti et al. | |
| 8,916,974 B2 | 12/2014 | Koti et al. | |
| 9,262,568 B2 | 2/2016 | Fu et al. | |
| 2012/0254816 A1* | 10/2012 | Brink | G06F 30/394 716/115 |
| 2017/0147729 A1* | 5/2017 | Svizhenko | G06F 30/39 |
| 2017/0177781 A1* | 6/2017 | Rose | G06F 30/398 |

OTHER PUBLICATIONS

A. Kurokawa et al., Dummy Filling methods for Reducing Interconnect Capacitance and Number of Fills, Proceedings of the Sixth International Symposium in Quality Electronic Design, ISQED'05, 2005, pp. 586-591.

* cited by examiner

*Primary Examiner* — Vuthe Siek
(74) *Attorney, Agent, or Firm* — Erik Johnson; Otterstedt, Wallace & Kammer, LLP (57) ABSTRACT

The accuracy of electronic design automation is increased by determining whether fill wires in a putative integrated circuit design should be effectively grounded or floating. For each signal wire in the putative design adjacent to the fill wires, a signal sensitivity value, which represents sensitivity of a given one of the plurality of signal wires to noise and timing, is determined. For each one of the fill wires, a fill sensitivity value is determined by: identifying coupling of each one of the fill wires to the adjacent signal wires; and calculating the fill sensitivity value as a combination of the signal sensitivity values of each of the adjacent signal wires for which the coupling has been identified. At least a portion of the fill wires are selectively effectively grounded based on the fill sensitivity value, to obtain a modified design.

20 Claims, 9 Drawing Sheets

SELECTIVELY GROUNDING FILL WIRES

BACKGROUND

The present invention relates to the electrical, electronic, and computer arts, and more specifically, to semiconductor Electronic Design Automation (EDA) and the like. EDA involves the use of software tools for designing electronic systems such as integrated circuits (ICs) and printed circuit boards. Capacitive coupling between neighboring wires in advanced technology nodes results in timing/noise challenges. In some technology nodes, "fill wires" (i.e. wires not actually carrying a necessary signal) may be required due to lithography constraints. Current EDA techniques do not necessarily provide suitable techniques determining whether or not these fill wires should be floating or grounded. Fill removal has been practiced to assist timing in high metal layers.

SUMMARY

Principles of the invention provide techniques for selectively grounding fill wires. In one aspect, an exemplary method for increasing the accuracy of electronic design automation by determining whether individual ones of a plurality of fill wires in a putative integrated circuit design should be effectively grounded or floating includes, for each signal wire of a plurality of signal wires in the putative integrated circuit design adjacent to the plurality of fill wires, determining a signal sensitivity value which represents sensitivity of a given one of the plurality of signal wires to noise and timing; for each one of the plurality of fill wires in the putative integrated circuit design, determining a fill sensitivity value by: identifying coupling of each one of the fill wires to the adjacent signal wires; and calculating the fill sensitivity value as a combination of the signal sensitivity values of each of the adjacent signal wires for which the coupling has been identified; and selectively effectively grounding at least a portion of the fill wires based on the fill sensitivity value, to obtain a modified integrated circuit design.

In another aspect, an exemplary computer includes a memory; and at least one processor, coupled to the memory, and operative to increase the efficiency of electronic design automation by determining whether individual ones of a plurality of fill wires in a putative integrated circuit design should be effectively grounded or floating, by carrying out steps including for each signal wire of a plurality of signal wires in the putative integrated circuit design adjacent to the plurality of fill wires, determining a signal sensitivity value which represents sensitivity of a given one of the plurality of signal wires to noise and timing; for each one of the plurality of fill wires in the putative integrated circuit design, determining a fill sensitivity value by: identifying coupling of each one of the fill wires to the adjacent signal wires; and calculating the fill sensitivity value as a combination of the signal sensitivity values of each of the adjacent signal wires for which the coupling has been identified; and selectively effectively grounding at least a portion of the fill wires based on the fill sensitivity value, to obtain a modified integrated circuit design.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

ability to design denser and more complicated circuits without overcompensating for negative coupling effects in timing and/or noise analyses; this may be especially beneficial in low metal layers of dense circuits where fill is required and noise issues could be large;

ability to provide noise reducing "shielding" where needed and float fill where timing is critical;

placing the fill in an optimal state can also reduce the pessimism in noise/timing simulations;

providing the designer an additional lever to fix noise and timing problems, which can lead to faster design closure.

These and other features and advantages of the present invention will become apparent from the following detailed description of illustrative embodiments thereof, which is to be read in connection with the accompanying drawings.

DETAILED DESCRIPTION

One or more embodiments provide techniques for selectively grounding fill wires. As noted, capacitive coupling between neighboring wires in advanced technology nodes results in timing/noise challenges. In some technology nodes, "fill wires" (i.e. wires not actually carrying a necessary signal) may be required due to lithography constraints. Current EDA techniques do not necessarily provide suitable techniques for determining whether these fill wires should be floating or grounded nor how to ground them when needed; indeed, there are non-trivial issues in making such a determination. Grounded fill can help reduce noise effects due to capacitive coupling, but may slow a circuit's switching speed (also referred to as timing). In the prior art, grounded nets have been used as "shielding" to protect noise sensitive wires. Floating fill can cause increased coupling to aggressor signals (thus hurting noise) but may result in faster timing.

It should be noted that a fill shape can be effectively grounded by connecting it to either a ground net or a VDD (voltage supply) net. This will essentially fix its voltage to a steady value and thus cause it to appear "grounded" or unchanging by the neighboring wires. As used herein, "effectively grounding" means fixing a voltage to a steady value by connection to an actual ground (which could be a relative ground such as a chassis ground or an actual connection to the Earth) or connection to a fixed voltage such as a supply voltage terminal and an "effective ground" means anything that is fixed relative to "ground" or "at a fixed voltage relative to ground."

One or more embodiments advantageously provide a solution that identifies the best "state" for a particular fill wire by balancing the noise and timing issues of the wires surrounding it. In one or more embodiments, this permits provision of noise reducing "shielding" where needed and float fill where timing is critical. In one or more instances, placing the fill in an optimal state can also reduce the pessimism in noise/timing simulations.

Figure 1:
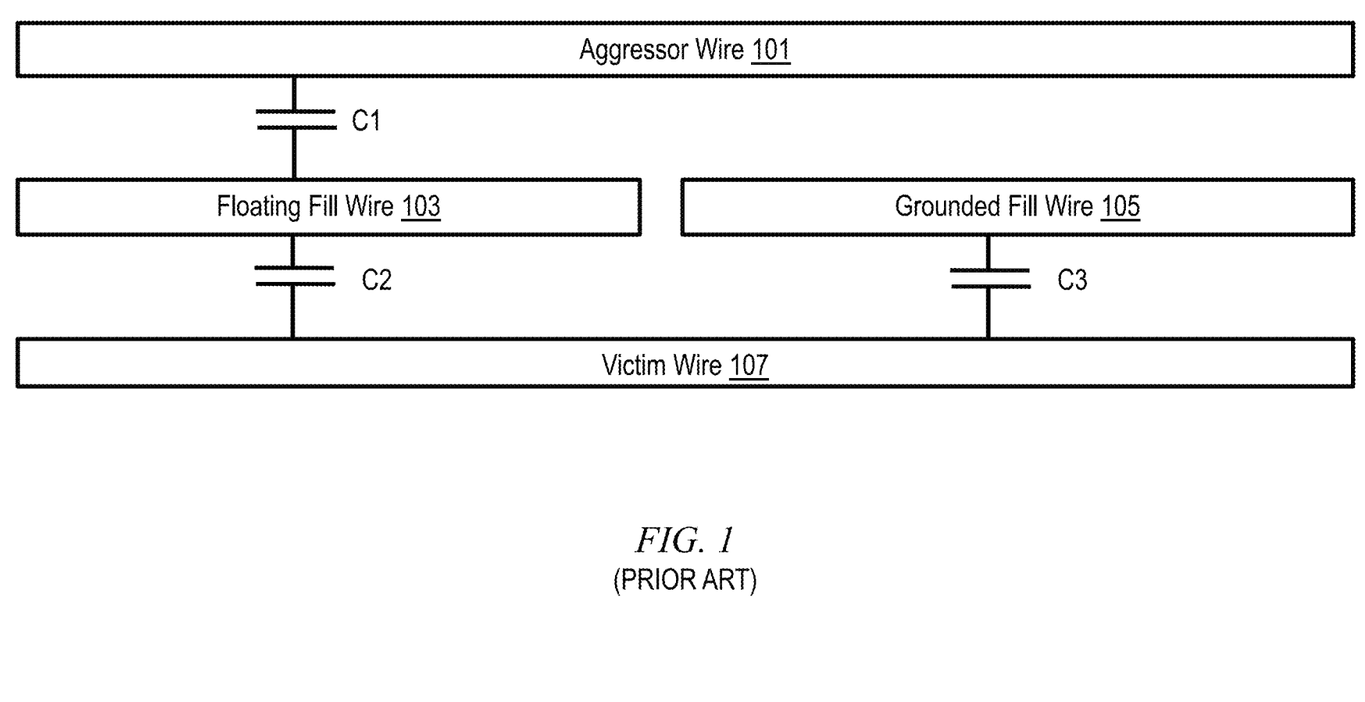
FIG. 1 illustrates effective capacitance of floating versus grounded fill wires, as known from the prior art.

Referring now to FIG. 1, note the aggressor wire 101, floating fill wire 103, grounded fill wire 105, and victim wire 107. There is a parasitic capacitance C1 between the aggressor wire and the floating fill wire; a parasitic capacitance C2 between the victim wire and the floating fill wire; and a parasitic capacitance C3 between the victim wire and the grounded fill wire. Noise from the aggressor wire undesirably couples into the victim wire. Floating fill increases the coupling between the victim and aggressor wires (as compared to grounded fill), thus increasing noise; however, it also decreases the total effective capacitance on the victim wire, resulting in faster timing transitions. Regarding grounded fill, grounded nets have been used as "shielding" to protect noise sensitive wires (thus decreasing noise); however, grounded fill wires increase the effective capacitance on the victim wire, resulting in slower timing transitions. It is worth noting that, technically, there is a small capacitance, not shown, between the aggressor and the victim even when a shield wire is present. However, it is much smaller than that without a shield wire, and thus is often treated as not being present.

One or more embodiments provide a methodology for calculating a "Sensitivity Value" indicating whether the collective neighboring wires are more sensitive to timing or noise and using this value to decide if the fill wire should be grounded or floating. Referring to the flow chart of FIG. 2, which begins at 201, one or more embodiments identify a noise/timing Signal Sensitivity Value (SSV) for all signal wires, as per step 203. For exemplary details of step 203, refer to the flow chart of FIG. 3, which is carried out for each signal wire, until all the signal wires are complete, as per the decision block 301. In step 303, evaluate the projected noise status (proximity to pass vs fail). In step 305, evaluate the projected timing status (proximity to pass vs fail). Optionally, divide the timing into Timing (the time it takes for a signal to traverse a circuit assuming non-switching neighbor wires) and Noise Impact On Timing (NIOT—the adjusted time it takes a signal to traverse a circuit when neighbor wires are allowed to switch and influence—i.e. add noise—to the signal). In step 307, assign a sensitivity value to represent how sensitive the net is to timing versus noise. For example, a positive value indicates more noise sensitive; while a negative value indicates more timing sensitive. Optionally, weight the positive or negative value to account for the strength of coupling to fill or relative noise/timing sensitivity. In step 309, save the Sensitivity Value. In one or more embodiments, noise and timing status evaluation indicates how sensitive the net is to failure due to noise and timing, respectively. The calculations can occur with varying accuracy at many points in the construction/synthesis flow. Various assumptions can be made about fill status during these calculations (e.g., ignore, assume floating, assume grounded, etc.). Optionally, timing status can be varied to account for timing with and without accounting for noise.

Figure 3:
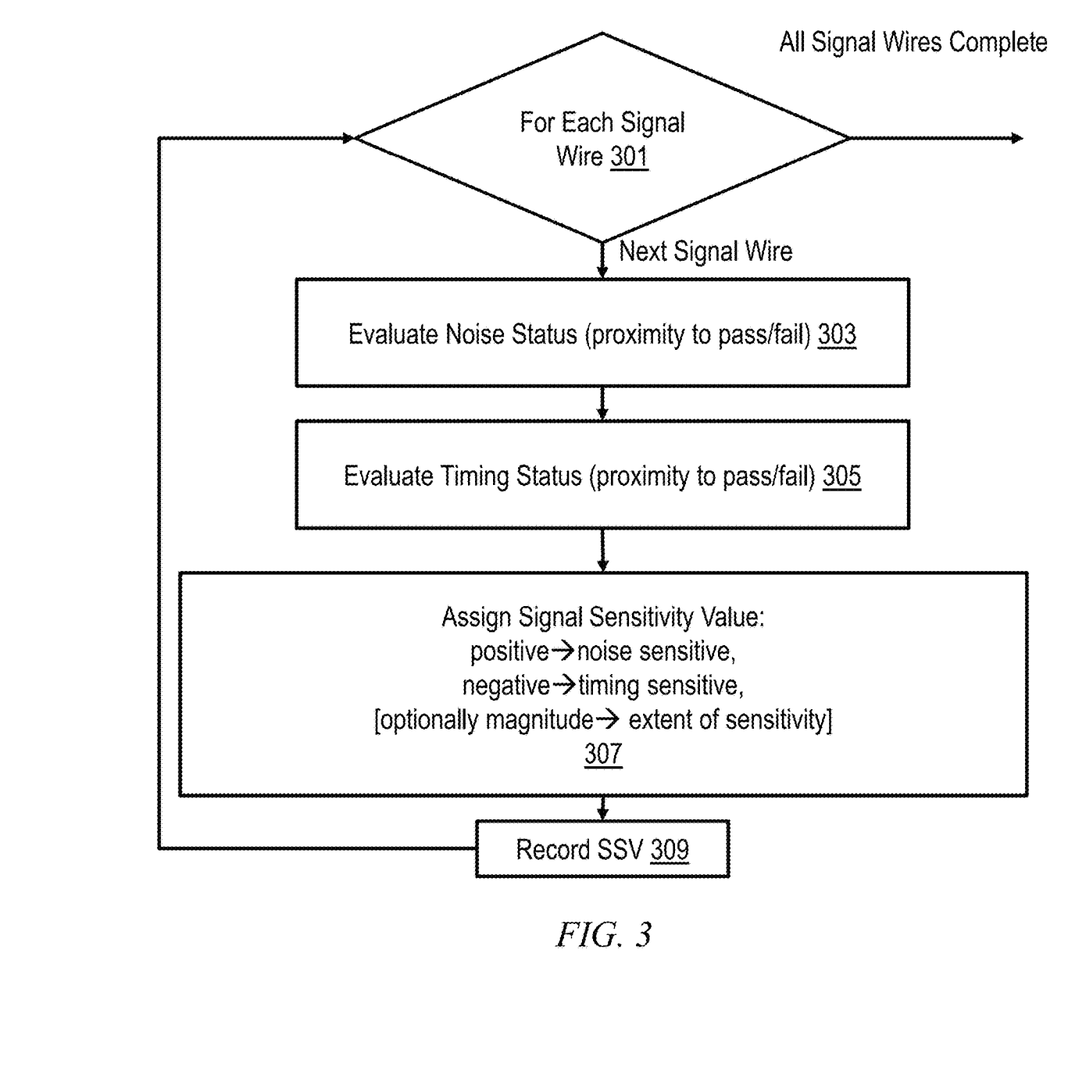
FIG. 3 is a detailed flow chart illustrating aspects of determining a signal sensitivity value (SSV), in accordance with one or more embodiments.

Consider several non-limiting exemplary SSV calculation detailed examples. In a first example, carry out the SSV calculation process early in the construction/synthesis flow. Ignore fill in the initial calculations. Use very simplistic timing/noise calculations (i.e. based on predictions of wire length, driver/sink abstracts, predicted congestion, and the like). An example sensitivity could be positive two for a long path through a congested area with poor noise tolerance gates, where the path is relatively timing insensitive. Another example sensitivity could be negative three for a short path on an extremely timing critical net in sparse area. This aspect enables prediction of fill state during initial wire synthesis and before detailed noise/timing calculations.

In a second example, carry out the SSV calculation process post construction/synthesis. Extract circuits assuming floating fill. Calculate detailed timing/noise results with extraction/timing windows and the like. In an example, the sensitivity could be plus four where a net fails, has very negative noise slack (noise slack is a metric comparing the observed noise against the maximum noise the circuit can tolerate before failure, with large negative values denoting bad failures), and very positive timing slack (timing slack is a metric comparing the observed switching time against the minimum/maximum switching time that the circuit can tolerate before failure, with large negative values denoting bad failures) because the net is failing noise and easily passing timing. Another example sensitivity could be neutral where the net easily passes noise and timing (0 sensitivity because this net does not care). Still another example sensitivity could be negative one where a net has slightly positive timing slack and extremely positive noise slack, for a slightly timing sensitive case. After having assigned FSVs, selected fill wires can be retroactively grounded with more certainty about which ones to target.

Figure 2:
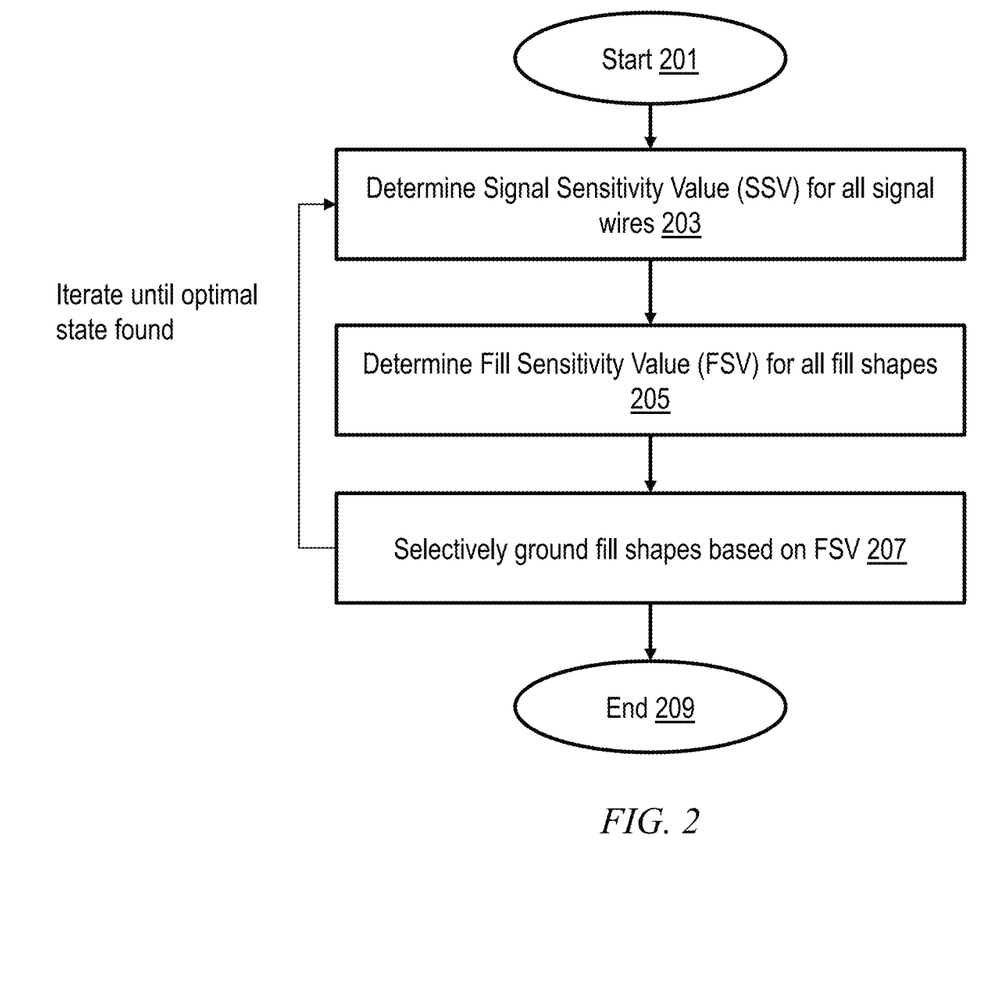
FIG. 2 is a high level flow chart illustrating aspects of determining whether fill wires should be grounded, in accordance with one or more embodiments.

Returning now to FIG. 2, in step 205, identify noise/timing Fill Sensitivity Values (FSV) for all fill shapes;

optionally, filter based on size and if the shapes can be grounded. For exemplary details of step 205, refer to the flow chart of FIG. 4, which is carried out for each fill wire, until all the fill wires are complete, as per the decision block 401. In step 403, identify coupling to neighboring signal wires. For example, identify all neighboring nets, optionally filtering neighbors based on coupling capacitance. In step 405, determine a Fill Sensitivity Value (FSV) accounting for neighbor SSVs, optionally weight the FSV based on the total coupling of the Sum Sensitivity values for all neighboring nets. FSV will indicate recommended corrective action. The fill sensitivity value is recorded in step 407. Regarding the corrective action, in one or more embodiments, if there is a positive value (noise sensitive), suggest grounding the fill; if there is a negative value (timing sensitive), suggest floating the fill.

Figure 4:
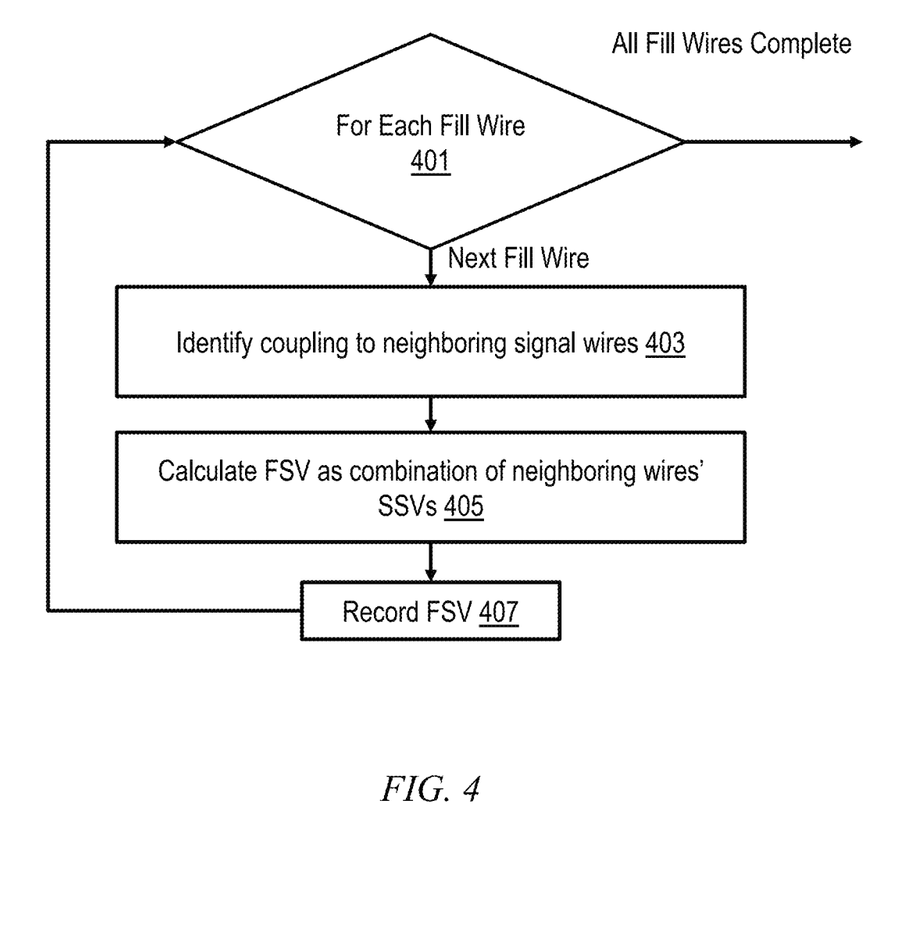
FIG. 4 is a detailed flow chart illustrating aspects of determining a fill sensitivity value (FSV), in accordance with one or more embodiments.

In some cases, the FSV calculation can be a simple sum of neighboring SSVs. Optionally, the FSV can be a weighted sum of SSVs based on the total coupling between the fill and signal wires. Optionally, fill wires below a certain size can be ignored. Optionally, signal wires with minimal coupling to fill can be ignored. For example, in one embodiment, fill wires that contribute less than 1% of the total coupling capacitance on a victim wire may be ignored because they do not significantly impact the victim wire. Optionally, fill wires that have been identified as not amenable to grounding can be ignored. For example, fill wires so small that they cannot be connected to a metal contact from a different metal layer can be ignored because it is physically impossible or at least unfeasible to ground them. Optionally, neighboring fill wires can be included in the FSV calculation. Given the teachings herein, the skilled artisan will be able to employ a number of different strategies to identify what legal paths are available and acceptable; the examples herein are not intended to be limiting.

Returning again to FIG. 2, in step 207, selectively ground fill shapes based on the FSV. For example, identify all legal floating fill ground paths. A legal floating fill ground path can be determined by starting at a segment of floating fill wire, and iteratively connecting to other fill wires (that can be connected within the design rules) until either contacting a segment of ground or VDD (supply voltage) OR exhausting all options of fill wire. For each path, use the FSVs of each segment to determine if the path should be grounded. The high-level flow chart ends at 209. One or more embodiments carry out the steps iteratively until the optimal state is found. For exemplary details of step 207, refer to the flow chart of FIG. 5, which is carried out for each fill wire, until all the fill wires are complete, as per the decision block 501. In step 503, identify one or more valid coupling paths between the fill wire and ground and voltage supply (Vdd). In decision block 507, determine whether the coupling path's cumulative FSV is positive (i.e., more noise sensitive). If NO, return to decision block 501. If YES, as per step 509, ground that path and return to decision block 501.

Figure 5:
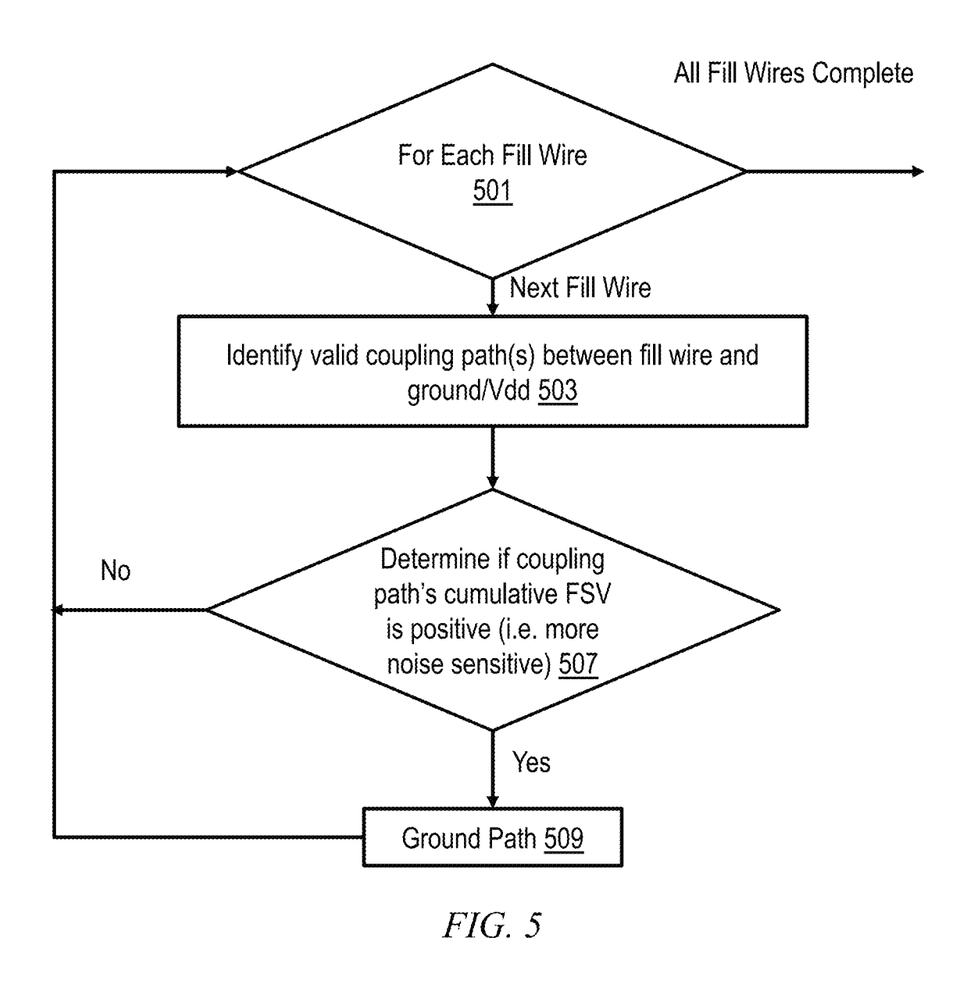
FIG. 5 is a detailed flow chart illustrating aspects of selectively grounding fill shapes based on FSV, in accordance with one or more embodiments.

There are a number of ways to identify valid coupling paths between fill and ground. For example, evaluate all fill shapes overlapping GND (ground)/Vdd (voltage supply) wires and trace all legal fill shape paths, and/or analyze only fill shapes with extremely positive FSVs (with thresholds to identify extremely positive FSVs identified through careful study of the various factors such as algorithm run time, total timing/noise benefit of changes, and the like, as will be appreciated by the skilled artisan given the teachings herein) and determine if there are legal paths to ground. Furthermore, there are many ways to determine if a particular coupling path should be effectively grounded. For example, if all fill wires on the path have positive FSVs (indicating noise sensitivity); if the sum of all FSVs is positive; and/or if the weighted sum (based on capacitance or wire length) of all FSVs is positive.

Aspects of the invention as described herein can be performed, for example, during routing, with initial estimates of noise/timing sensitivity. Refer to step 911 in FIG. 9, discussed elsewhere herein. In another approach, aspects of the invention as described herein can be performed, for example, after routing and full timing/noise analysis is complete; e.g., during step 913 in FIG. 9. Indeed, in one or more embodiments, timing/noise closure is implemented as an iterative process of carrying out detailed analysis, looking at what fails, identifying potential fixes, implementing the fixes, and reanalyzing the new circuit. It is during this iterative process that one or more embodiments disclosed herein can be applied to make things easier.

Depending on how extraction is performed, it is possible that there may only be coupling estimates assuming 1) effectively grounded fill or 2) floating fill. This will impact the noise/timing analysis and how decisions are weighted. For example, if all fill is treated as floating, then the noise analysis may be pessimistic because some of those fill wires may end up being effectively grounded in the final design. As a result, it may be appropriate to adjust how noise and timing performance are balanced when calculating an SSV.

Analysis could, for example, be provided to a designer who manually makes the final decision about fill state and implements the change (i.e. the designer sees values on the neighboring fill, letting the designer know he or she has the option of adjusting the state to change design performance). Analysis could also be performed by the system and a change could be automatically enforced.

In some cases, if NIOT data is available, then even some timing-critical nets may actually be noise sensitive. Thus, if this information is available, then the weighting and positive/negative determination may be adjusted.

Some embodiments limit which fill shapes are analyzed; for example, in some instances, the analysis can be rejected for very small shapes (i.e. shapes that contribute a very small percentage of the total capacitance as described earlier) or shapes not amenable to grounding. Given the teachings herein, the skilled artisan will appreciate which shapes are "very small" or not amenable to grounding, for purposes of this aspect.

Some embodiments limit which neighboring wires are considered for voting; for example, some embodiments reject neighboring wires based on a total coupling capacitance threshold.

Advantageously, one or more embodiments enable design of denser and more complicated circuits without overcompensating for negative coupling effects in the timing or noise analysis. This is believed to be particularly advantageous in low metal layers of dense circuits where fill is required and noise issues can be significant.

In one or more embodiments, calibration to implement an accurate voting system to come up with the best outcomes may be pertinent. Furthermore in this regard, one or more embodiments include a methodology that provides for a significant amount of customization in terms of how to assign SSVs, how to aggregate SSVs into FSVs, how to define paths to effective ground, and how to make a final decision regarding whether it is actually desirable to effectively ground a net. All of these decisions will typically impact the run time of the analysis and affect how much improvement the overall circuit achieves. Thus, it is appropriate, in one or more embodiments, to calibrate the system to ensure that, for example, ten hours of computational effort are not added in order to achieve only a few ps or mV of noise/timing performance.

One or more embodiments provide a system and/or method of identifying whether fill wires in a circuit should be floating or effectively grounded during wire synthesis/routing, based on the projected impact on one or more neighboring nets, wherein each neighboring net has been evaluated for noise and timing sensitivity, each neighboring net has been awarded a "Signal Sensitivity Value" classifying how strongly sensitive it is to either noise or timing, Signal Sensitivity Values from neighbors are aggregated to determine a "Fill Sensitivity Value" (indicating the optimal state for each piece of fill to minimize noise/timing failures), and viable paths to effective ground through floating fill are identified. In one or more embodiments, each path is evaluated to determine if any portion of the path should be effectively grounded based on the Fill Sensitivity Values along the path.

In some instances, computation is completed after the routing process is complete.

In some cases, limited extraction information is available regarding total coupling between fill shapes and neighbors.

In some embodiments, timing analysis is subcategorized into path based delay and noise based delay.

Some embodiments limit which fill shapes are analyzed.

Some instances, where a fill shape is large enough to be divided into smaller independent pieces, consider hypothetical smaller fill shapes that allow improved grounding solutions based on timing/noise tradeoff.

One or more embodiments provide a guided tradeoff between floating and effectively grounded fill explicitly as a technique for selectively improving timing or reducing coupling noise.

One or more embodiments add fill taking into account the capacitance between the fill and neighboring signal nets, and/or considering the timing and/or noise effects of the fill.

One or more embodiments improve prior art timing and metal-density-aware routing by using a tradeoff between floating fill and effectively grounded fill to help meet timing and noise-avoidance specifications.

As noted, in one or more embodiments, aspects of the invention as described herein can be performed, for example, during routing, with initial estimates of noise/timing sensitivity, or after routing and full timing/noise analysis is complete. One or more embodiments thus differ from prior art techniques where considerations to timing are made later in the design process through iterations with extraction and timing analysis. One or more embodiments are carried out without this type of prior art iteration, and/or take into account noise avoidance and/or signal delays on critical nets while the fill is being added.

Thus, it will be appreciated that one or more embodiments use fill to enhance the timing or noise response of a circuit. Indeed, one or more embodiments target specific critical nets to improve their timing and/or their noise susceptibility; and/or provide a guided tradeoff between floating and grounded fill explicitly as a means of selectively improving timing and/or reducing coupling noise.

Given the discussion thus far, it will be appreciated that in some embodiments, an exemplary method is provided for increasing the accuracy of electronic design automation by determining whether individual ones of a plurality of fill wires in a putative integrated circuit design should be effectively grounded or floating (e.g. by making a more informed design decision). Recall that, as indicated above, a fill shape can be effectively grounded by connecting it to either a ground net or a VDD net. This will essentially fix its voltage to a steady value and thus cause it to appear "grounded" or unchanging by the neighboring wires. According to an aspect of the invention, such an exemplary method includes, as per step 203, for each signal wire of a plurality of signal wires in the putative integrated circuit design adjacent to the plurality of fill wires, determining a signal sensitivity value which represents sensitivity of a given one of the plurality of signal wires to noise and timing. The method further includes, as per step 205, for each one of the plurality of fill wires in the putative integrated circuit design, determining a fill sensitivity value. In one or more embodiments, this is done by identifying coupling of each one of the fill wires to the adjacent signal wires, as per step 403; and calculating the fill sensitivity value as a combination of the signal sensitivity values of each of the adjacent signal wires for which the coupling has been identified, as per step 405. The method still further includes, as per step 207, selectively effectively grounding at least a portion of the fill wires based on the fill sensitivity value, to obtain a modified integrated circuit design.

In one or more embodiments, the determining of the signal sensitivity value includes, as per step 303, for each signal wire in the putative integrated circuit design adjacent to the fill wires, evaluating a noise status including a proximity to failing a noise criterion; as per step 305, for each signal wire in the putative integrated circuit design adjacent to the fill wires, evaluating a timing status including a proximity to failing a timing criterion; and, as per step 307, assigning the signal sensitivity as a value with a first sign if the noise status dominates the timing status, and as a value with a second sign opposite the first sign if the timing status dominates the noise status.

In one or more embodiments, the first sign is positive and the second sign is negative. However, for the avoidance of doubt, in one or more embodiments, the selection of which sign is positive and which sign is negative is arbitrary and can be defined as desired.

One or more embodiments further include, as per step 307, respectively weighting the value with the first sign or the value with the second sign based on a relative strength with which the noise status dominates the timing status or the timing status dominates the noise status.

In the determining of the fill sensitivity value, the combination aspect can include, for example, simple (i.e., unweighted) summing or weighted summing.

As noted elsewhere, in the determining of the fill sensitivity value, fill wires below a size threshold can be ignored, fill wires not amenable to effective grounding can be ignored, and/or signal wires below a coupling threshold can be ignored.

In one or more embodiments, the step of selectively effectively grounding at least the portion of the fill wires based on the fill sensitivity value, to obtain the modified integrated circuit design, includes: as at step 503, for each of the fill wires, identifying at least one valid coupling path to ground or voltage supply; as per decision block 507, for each of the fill wires, determining whether a cumulative fill sensitivity value of the at least one valid coupling path to ground or voltage supply indicates dominance by sensitivity to noise; and, responsive to the determining indicating the dominance by sensitivity to noise (YES branch of decision block 507), effectively grounding the at least one valid coupling path as per step 509. Furthermore in this regard, when seeking to effectively ground a fill shape, it may be necessary to connect to multiple pieces of metal in order to build a path all the way to a ground (or voltage supply) wire.

Thus, the "coupling path" may include one or more fill shapes that need to be connected together. Accordingly, when the final decision is made regarding whether to ground a particular path, it is appropriate to consider the impact grounding will have on all of the shapes in that path. Thus, in one case, a shape that is actually timing sensitive may end up being effectively grounded, because effectively grounding the one timing-sensitive shape allows many other noise-sensitive shapes to be successfully effectively grounded.

One or more embodiments include fabricating a physical integrated circuit in accordance with the modified integrated circuit design. For example, referring to FIGS. 7-9 discussed elsewhere herein, render the modified integrated circuit design in a design language; and prepare a layout based on the modified integrated circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 7. A physical integrated circuit is then fabricated in accordance with the design structure. See again discussion of FIG. 7. Refer also to FIG. 8. Once the physical design data is obtained, based, in part, on the analytical processes described herein, an integrated circuit designed in accordance therewith can be fabricated according to known processes that are generally described with reference to FIG. 8. Generally, a wafer with multiple copies of the final design is fabricated and cut (i.e., diced) such that each die is one copy of the integrated circuit. At block 810, the processes include fabricating masks for lithography based on the finalized physical layout. At block 820, fabricating the wafer includes using the masks to perform photolithography and etching. Once the wafer is diced, testing and sorting each die is performed at 830 to filter out any faulty die.

Figure 6:
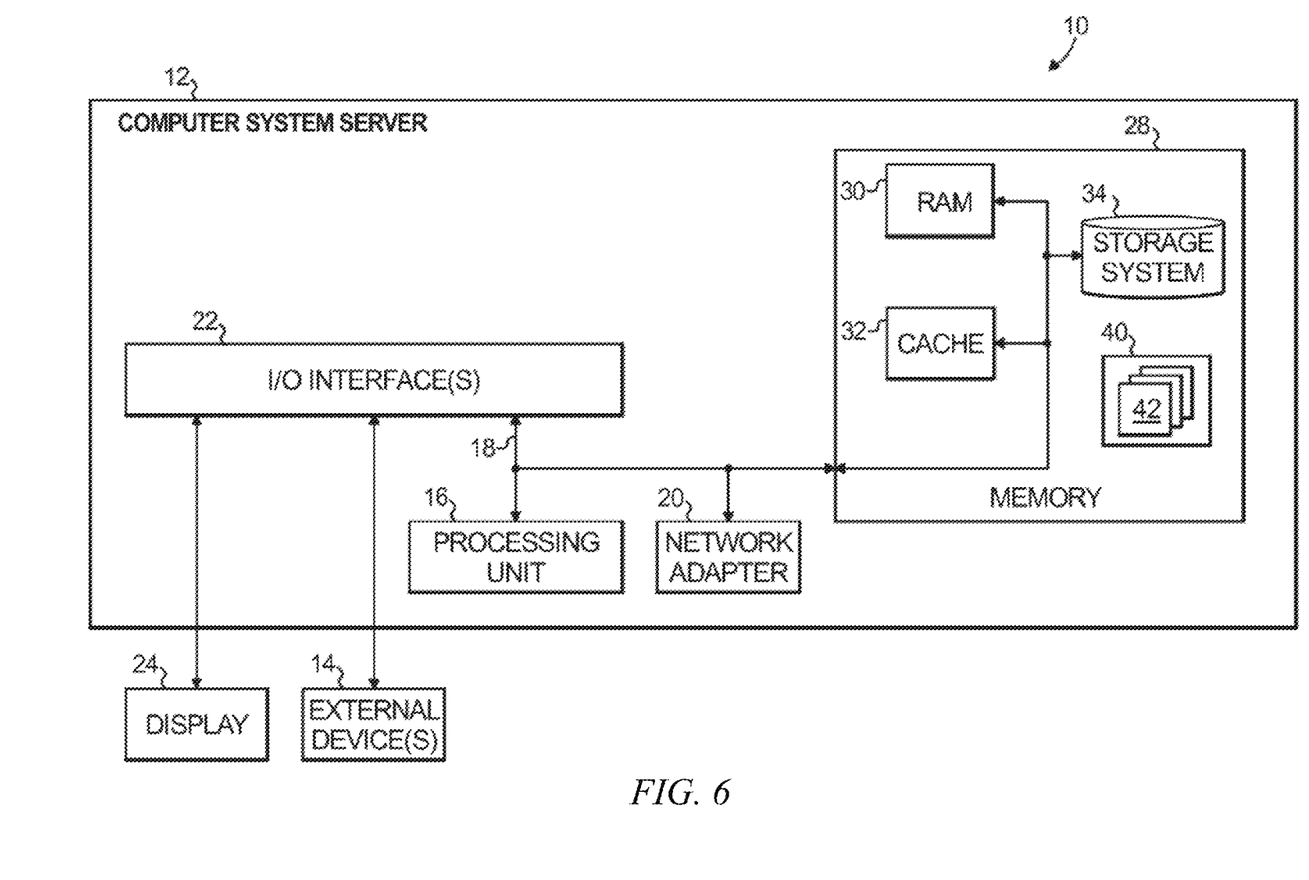
FIG. 6 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 6). In one or more embodiments, the performance (speed) of this computer is improved, for example, by the enhanced accuracy and/or reduced pessimism of the design process including techniques for determining whether to ground or float fill wires as disclosed herein. Accordingly, the amount of computer resources/CPU time needed during the design cycle, as well as the amount of human design engineer hours, can be reduced using aspects of the invention.

Figure 7:
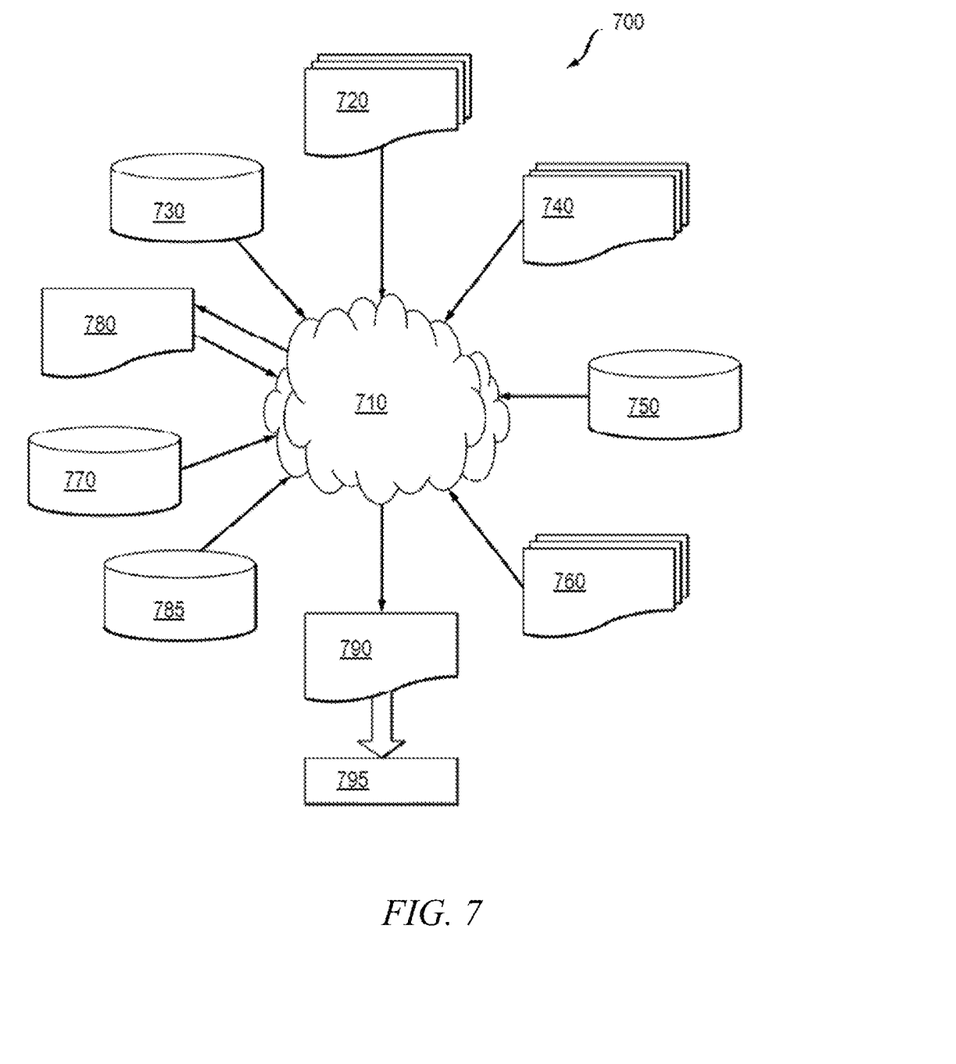
FIG. 7 is a flow diagram of a design process used in semiconductor design, manufacture, and/or test.
Figure 8:
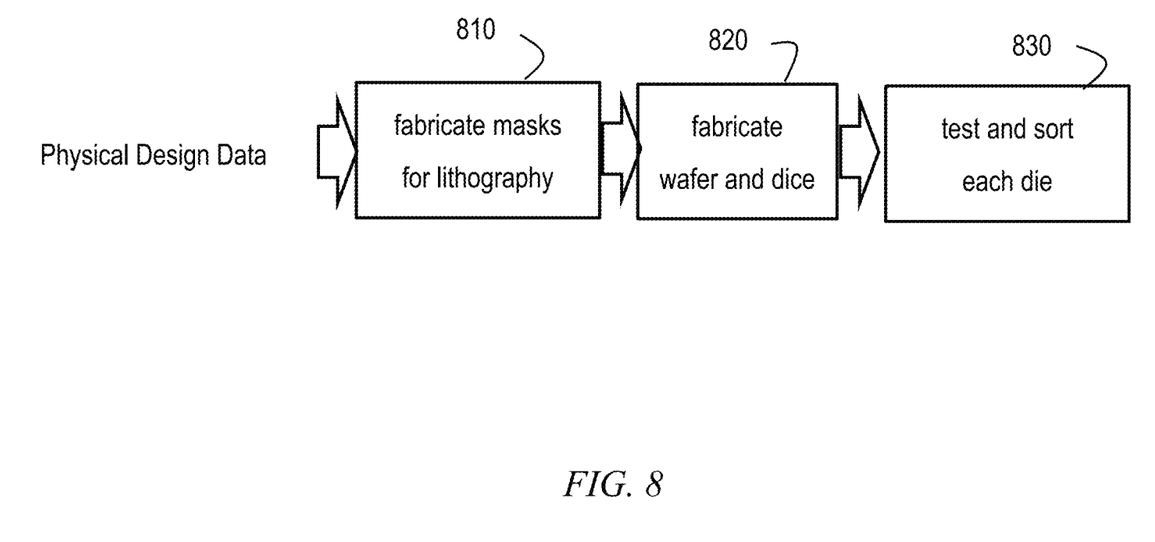
FIG. 8 shows further aspects of IC fabrication from physical design data.

Furthermore, referring to FIG. 7, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved as compared to designs not using aspects of the invention for EDA. For example, the improvements can include any one, some, or all of: providing noise reducing "shielding" where needed and float fill where timing is critical; reducing the pessimism in noise/timing simulations (e.g., providing denser and more complicated circuits without overcompensating for negative coupling effects in the timing and/or noise analysis, which may be especially pertinent in low metal layers of dense circuits where fill is required and noise issues could be large); improved timing; reduced coupling noise.

Figure 9:
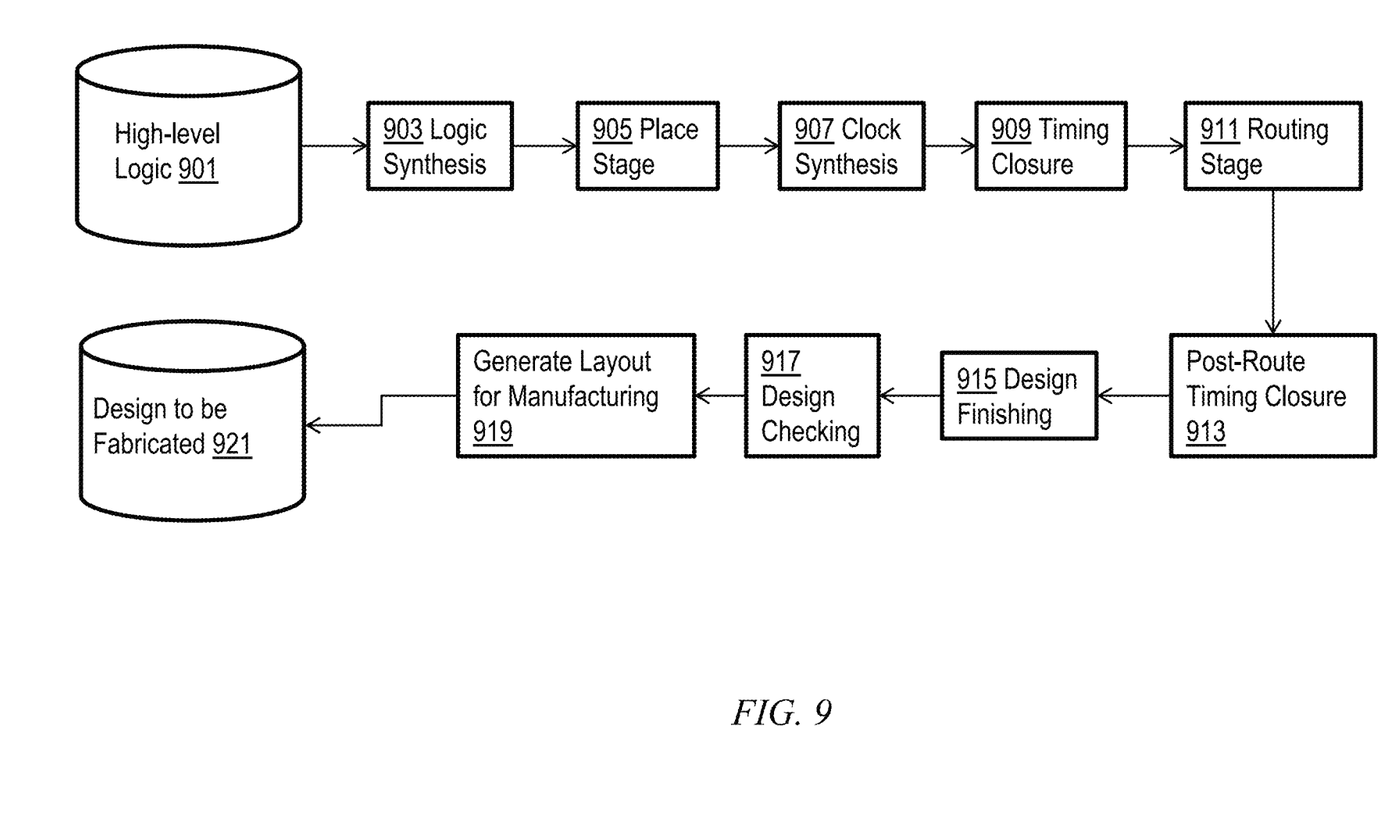
FIG. 9 shows an exemplary high-level Electronic Design Automation (EDA) tool flow, within which aspects of the invention can be employed.

FIG. 9 depicts an example high-level Electronic Design Automation (EDA) tool flow, which is responsible for creating an optimized microprocessor (or other IC) design to be manufactured. A designer could start with a high-level logic description 901 of the circuit (e.g. VHDL or Verilog). The logic synthesis tool 903 compiles the logic, and optimizes it without any sense of its physical representation, and with estimated timing information. The placement tool 905 takes the logical description and places each component, looking to minimize congestion in each area of the design. The clock synthesis tool 907 optimizes the clock tree network by cloning/balancing/buffering the latches or registers. The timing closure step 909 performs a number of optimizations on the design, including buffering, wire tuning, and circuit repowering; its goal is to produce a design which is routable, without timing violations, and without excess power consumption. The routing stage 911 takes the placed/optimized design, and determines how to create wires to connect all of the components, without causing manufacturing violations. Post-route timing closure 913 performs another set of optimizations to resolve any violations that are remaining after the routing. Design finishing 915 then adds extra metal shapes to the netlist, to conform with manufacturing requirements. The checking steps 917 analyze whether the design is violating any requirements such as manufacturing, timing, power, electromigration (e.g., using techniques disclosed herein) or noise. When the design is clean, the final step 919 is to generate a layout for the design, representing all the shapes to be fabricated in the design to be fabricated 921.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 7 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing the accuracy of electronic design automation by determining whether individual ones of a plurality of fill wires in a putative integrated circuit design should be effectively grounded or floating, the method comprising:
   for each signal wire of a plurality of signal wires in said putative integrated circuit design adjacent to said plurality of fill wires, determining a signal sensitivity value which represents sensitivity of a given one of said plurality of signal wires to noise and timing;
   for each one of said plurality of fill wires in said putative integrated circuit design, determining a fill sensitivity value by:
   identifying coupling of each one of said fill wires to said adjacent signal wires;
   calculating said fill sensitivity value as a combination of said signal sensitivity values of each of said adjacent signal wires for which said coupling has been identified; and
   selectively effectively grounding a first portion of said fill wires based on said fill sensitivity value, and allowing a second portion of said fill wires to float based on said fill sensitivity value, to obtain a modified integrated circuit design.

2. The method of claim 1, wherein said determining said signal sensitivity value comprises:
   for each signal wire in said putative integrated circuit design adjacent to said fill wires, evaluating a noise status comprising a proximity to failing a noise criterion;
   for each signal wire in said putative integrated circuit design adjacent to said fill wires, evaluating a timing status comprising a proximity to failing a timing criterion; and
   assigning said signal sensitivity as a value with a first sign if said noise status dominates said timing status, and as a value with a second sign opposite said first sign if said timing status dominates said noise status.

3. The method of claim 2, wherein said first sign is positive and said second sign is negative.

4. The method of claim 3, further comprising respectively weighting said value with said first sign or said value with said second sign based on a relative strength with which said noise status dominates said timing status or said timing status dominates said noise status.

5. The method of claim 2, wherein, in said determining of said fill sensitivity value, said combination comprises simple summing.

6. The method of claim 2, wherein, in said determining of said fill sensitivity value, said combination comprises weighted summing.

7. The method of claim 2, further comprising, in said determining of said fill sensitivity value, ignoring fill wires below a size threshold.

8. The method of claim 2, further comprising, in said determining of said fill sensitivity value, ignoring fill wires not amenable to effective grounding.

9. The method of claim 2, further comprising, in said determining of said fill sensitivity value, ignoring signal wires below a coupling threshold.

10. The method of claim 2, wherein said step of selectively effectively grounding at least said portion of said fill wires based on said fill sensitivity value, to obtain said modified integrated circuit design, comprises:
    for each of said fill wires, identifying at least one valid coupling path to ground or voltage supply;
    for each of said fill wires, determining whether a cumulative fill sensitivity value of said at least one valid coupling path to ground or voltage supply indicates dominance by sensitivity to noise; and
    responsive to said determining indicating said dominance by sensitivity to noise, effectively grounding said at least one valid coupling path.

11. The method of claim 2, further comprising fabricating a physical integrated circuit in accordance with said modified integrated circuit design.

12. The method of claim 11, further comprising:
    rendering said modified integrated circuit design in a design language; and preparing a layout based on said modified integrated circuit design rendered in said design language; and instantiating said layout as a design structure;

wherein said physical integrated circuit is fabricated in accordance with said design structure.

13. The method of claim 2, wherein said step of selectively effectively grounding said at least a portion of said fill wires based on said fill sensitivity value, to obtain said modified integrated circuit design, comprises interconnection to a ground.

14. The method of claim 2, wherein said step of selectively effectively grounding said at least a portion of said fill wires based on said fill sensitivity value, to obtain said modified integrated circuit design, comprises interconnection to a voltage supply terminal.

15. A computer comprising:

a memory; and at least one processor, coupled to said memory, and operative to increase the efficiency of electronic design automation by determining whether individual ones of a plurality of fill wires in a putative integrated circuit design should be effectively grounded or floating, by carrying out steps comprising:

for each signal wire of a plurality of signal wires in said putative integrated circuit design adjacent to said plurality of fill wires, determining a signal sensitivity value which represents sensitivity of a given one of said plurality of signal wires to noise and timing;

for each one of said plurality of fill wires in said putative integrated circuit design, determining a fill sensitivity value by:

identifying coupling of each one of said fill wires to said adjacent signal wires;

calculating said fill sensitivity value as a combination of said signal sensitivity values of each of said adjacent signal wires for which said coupling has been identified; and selectively effectively grounding a first portion of said fill wires based on said fill sensitivity value, and allowing a second portion of said fill wires to float based on said fill sensitivity value, to obtain a modified integrated circuit design.

16. The computer of claim 15, wherein said at least one processor is operative to determine said signal sensitivity value by:

for each signal wire in said putative integrated circuit design adjacent to said fill wires, evaluating a noise status comprising a proximity to failing a noise criterion;

for each signal wire in said putative integrated circuit design adjacent to said fill wires, evaluating a timing status comprising a proximity to failing a timing criterion; and assigning said signal sensitivity as a value with a first sign if said noise status dominates said timing status, and as a value with a second sign opposite said first sign if said timing status dominates said noise status.

17. The computer of claim 16, wherein said at least one processor is operative to render said modified integrated circuit design in a design language;

prepare a layout based on said modified integrated circuit design rendered in said design language;

instantiate said layout as a design structure; and provide said design structure to fabrication equipment to facilitate fabrication of a physical integrated circuit in accordance with said design structure.

18. A non-transitory computer readable medium comprising computer executable instructions which when executed by a computer performing electronic design automation cause the computer to perform a method which increases the accuracy of electronic design automation by determining whether individual ones of a plurality of fill wires in a putative integrated circuit design should be effectively grounded or floating, the method comprising:

for each signal wire of a plurality of signal wires in said putative integrated circuit design adjacent to said plurality of fill wires, determining a signal sensitivity value which represents sensitivity of a given one of said plurality of signal wires to noise and timing;

for each one of said plurality of fill wires in said putative integrated circuit design, determining a fill sensitivity value by:

identifying coupling of each one of said fill wires to said adjacent signal wires;

calculating said fill sensitivity value as a combination of said signal sensitivity values of each of said adjacent signal wires for which said coupling has been identified; and selectively effectively grounding a first portion of said fill wires based on said fill sensitivity value, and allowing a second portion of said fill wires to float based on said fill sensitivity value, to obtain a modified integrated circuit design.

19. The non-transitory computer readable medium of claim 18, wherein said determining said signal sensitivity value comprises:

for each signal wire in said putative integrated circuit design adjacent to said fill wires, evaluating a noise status comprising a proximity to failing a noise criterion;

for each signal wire in said putative integrated circuit design adjacent to said fill wires, evaluating a timing status comprising a proximity to failing a timing criterion; and assigning said signal sensitivity as a value with a first sign if said noise status dominates said timing status, and as a value with a second sign opposite said first sign if said timing status dominates said noise status.

20. The non-transitory computer readable medium of claim 19, wherein said computer executable instructions, when executed by said computer, further cause said computer to render said modified integrated circuit design in a design language;

prepare a layout based on said modified integrated circuit design rendered in said design language;

instantiate said layout as a design structure; and provide said design structure to fabrication equipment to facilitate fabrication of a physical integrated circuit in accordance with said design structure.

* * * * *